(12) United States Patent
Aggarwal et al.

(10) Patent No.: US 11,190,289 B2
(45) Date of Patent: Nov. 30, 2021

(54) RADIO STATION RECOMMENDATIONS

(71) Applicant: Google LLC, Mountain View, CA (US)

(72) Inventors: Vikram Aggarwal, Mountain View, CA (US); Piyush Agarwal, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/622,548

(22) PCT Filed: Aug. 23, 2018

(86) PCT No.: PCT/US2018/047832
§ 371 (c)(1),
(2) Date: Dec. 13, 2019

(87) PCT Pub. No.: WO2020/040778
PCT Pub. Date: Feb. 27, 2020

(65) Prior Publication Data
US 2020/0343986 A1    Oct. 29, 2020

(51) Int. Cl.
*H04W 4/02*     (2018.01)
*H04H 60/43*    (2008.01)
*H04H 60/42*    (2008.01)
*H04H 60/47*    (2008.01)
*H04W 4/021*    (2018.01)

(52) U.S. Cl.
CPC ............ *H04H 60/43* (2013.01); *H04H 60/42* (2013.01); *H04H 60/47* (2013.01); *H04W 4/021* (2013.01); *H04H 2201/13* (2013.01)

(58) Field of Classification Search
CPC ......... H04W 4/029; H04W 4/02; G01S 13/88; G01S 5/0027; G01S 5/0263
See application file for complete search history.

(56) References Cited

U.S. PATENT DOCUMENTS 6,697,631 B1   2/2004   Okamoto
8,255,378 B2   8/2012   Ji et al.
9,380,383 B2   6/2016   Brenner et al.
9,762,339 B2   9/2017   Williams
(Continued)

OTHER PUBLICATIONS

European Patent Office; International Search Report and Written Opinion of Ser. No. PCT/US2018/047832; 18 pages dated Apr. 8, 2019.
(Continued)

*Primary Examiner* — Tu X Nguyen
(74) *Attorney, Agent, or Firm* — Middleton Reutlinger

(57) ABSTRACT

Implementing and applying a database with radio station information that is gathered from client devices as stations become available to a plurality of users (i.e., "crowd sourced" radio station information) and allowing for a client device to download only the radio station information that is pertinent to the travel route of the user and/or radio station selection criteria associated with the client device or the user. Radio station information can be rendered via a graphical interface of a client device to allow the user to informatively select a new radio station, either before or as a current radio signal degrades to the point of being unusable. Radio station information may be rendered to cause the user's terrestrial radio to tune to a new station.

9 Claims, 8 Drawing Sheets

(56) References Cited

U.S. PATENT DOCUMENTS

| | | | |
|---|---|---|---|
| 9,887,792 B2 | 2/2018 | Husmann et al. | |
| 9,985,736 B2 | 5/2018 | Husmann et al. | |
| 2010/0094897 A1 | 4/2010 | Sumrall et al. | |
| 2013/0247082 A1 | 9/2013 | Wang et al. | |
| 2014/0115637 A1* | 4/2014 | Stanforth | H04W 4/029 725/62 |
| 2016/0329977 A1* | 11/2016 | Williams | H04W 36/32 |

OTHER PUBLICATIONS

Cunningham, W. "Want radio with Apple CarPlay? Gracenote has an app for that;" RoadShow by CNET; https://www.cnet.com/roadshow/news/want-radio-with-apple-carplay-gracenote-has-an-app-for-that/; 8 pages; Jan. 11, 2018.

Gracenote, Music ID Radio; "Music Recognition for Radio in the Car;" retrieved from internet, http://www.gracenote.com/auto/smart-radio-solutions/music-id-radio/; 9 pages; retrieved on Jul. 17, 2018.

Sensory Inc. "TrulySecure for Mobile Phones, Tablets and PCs;" retrieved from internet: https://www.sensory.com/wp-content/uploads/80-0357-A.pdf; 1 page; retrieved from internet on Aug. 27, 2018.

* cited by examiner

RADIO STATION RECOMMENDATIONS

BACKGROUND

When a user travels from one location to another, the strength and availability of radio signals can vary. For example, while driving between a home location and a destination, the user may lose one or more radio station signals because the user is out of range of the broadcast capabilities of the stations. Further, as the user gets closer to new broadcast locations, additional signals may become available. For example, a radio receiver of a user may detect a radio signal while the receiver is within 50 miles of a transmission tower of a radio signal, but the quality of the signal may degrade outside of the 50-mile radius. Also, for example, as the user continues from a starting location to a destination location, the receiver may not receive a quality signal from a broadcast tower until the receiver is within a distance from the tower.

Multiple radio stations are available in nearly any area; however, a user may find difficulty in tuning a receiver to a new station when a current station signal degrades. For example, a user may have to search the radio spectrum, via the receiver, to locate a new signal when a current signal degrades to an unacceptable quality. Further, the user may not find an acceptable radio station just by scanning signals. For example, the user may have interest in only certain radio genres and may have difficulty locating an acceptable substitute just by scanning the available stations. Further, because many radio stations include commercial broadcasts between content, a user may locate a station but because a commercial is being aired, the user may not be able to identify the genre of the station so may continue scanning. In other examples, the receiver may only be able to receive or decode a subset of the available radio stations, e.g. as a consequence of permissions granted to, or capabilities of, the receiver.

Although databases exist with radio station information (e.g., frequency, genre, location), maintaining such databases may be difficult because of changes in signal strengths, changes in genres, and/or changes in broadcast frequencies. Also, capturing and/or maintaining such databases can also be time consuming (e.g., computational time) and such databases can be prone to failure. Further, keeping a database maintained on a client device, such as a vehicle device or personal device, may require constant network connection to ensure that the downloaded information is current. Additionally, the data in an entire database of radio station information may be large and require significant local storage on the client device, even though much of the data is not pertinent for a user trip between destinations. Alternatively, the entire database of radio station may not be sufficiently granular. For example, a database of radio station information provided by a government agency may only identify general, e.g., circular broadcast areas, whereas in reality, the broadcast areas may be irregular due to factors such as geography, manmade features, etc. While Internet-based radio is becoming more common and allows users to listen to a particular radio station without regard to their location network coverage, such as that provided by cellular networks, may not extend to certain areas in which terrestrial radio signals are still available.

SUMMARY

Implementations described herein populate a database with radio station information that is gathered from client devices as stations become available to a plurality of users (i.e., "crowd sourced" radio station information). Once gathered, the radio station information may be selectively provided to the same or other client devices, thereby to enable terrestrial radio receivers associated with the client devices to be operated more efficiently when tuning to new stations (e.g. when the terrestrial radio receiver is determined to be leaving, or have left, a coverage area of a radio station to which the terrestrial radio receiver is currently tuned). Efficient operation of the radio receiver may be particularly beneficial when the user is driving since it may result in less distraction for the driver. By using crowd-sourcing and storing the radio station information centrally rather than at the client devices, the radio station information, which may include information describing the coverage areas of the radio stations as well as broadcast frequency, both of which may change over time, may be kept up-to-date. Additionally or alternatively, implementations described herein allow for a client device to download only the radio station information that is pertinent to the travel route of the user and/or radio station selection criteria associated with the client device or the user, thus reducing storage space required on the client device. Furthermore, the pertinent radio station information for the route of travel may be downloaded to the client at an opportune moment when the client device has network coverage (for instance, when the route is initially determined or when the journey commences). In this way, the client device, which may not have network access at all times throughout a particular journey, may not be required to access the network during the journey in order to obtain radio station information that is pertinent to its current location. Finally, implementations described herein render radio station information via a graphical interface of a client device to allow the user to informatively select a new radio station, either before or as a current radio signal degrades to the point of being unusable. This may improve the efficiency with which radio receivers can be tuned to new stations when the need arises. For example, known coverage areas of radio stations may be displayed as overlaying layers of a mapping application which could execute on a smart phone or vehicular computing device. In some implementations, these overlaying layers may be operable (e.g., tappable, selectable) to cause the user's terrestrial radio in the vehicle to tune to a new station.

In some implementations, radio signal information is received from a client device. The client device may be, for example, a vehicle computer, a smartphone, and/or any other device that can receive a terrestrial radio signal or that is communicatively coupled with a device that can receive a terrestrial radio signal. For example, the client device may be operably coupled with a terrestrial radio system (e.g., FM, AM) that is standard equipment in virtually all vehicles. In various implementations, this operable coupling may be achieved using wired connections or even wireless connections (e.g., Bluetooth, Wi-Fi), and may enable the client device to control the terrestrial radio system, e.g., to tune the terrestrial radio system's antenna to a selected frequency.

The radio signal received by the client device may include additional encoded information, or "metadata," such as a genre of the broadcasting station, current song being played, radio station call letters, broadcast tower location(s), signal strength, and/or additional or alternative information regarding the origin and nature of the signal. The radio signal frequency, the current user location (e.g., identified from triangulation of signals, GPS, and/or other methods), and any additional information is received via network communication on a periodic basis, such as only when a network connection is available and/or on an hourly basis.

A database is maintained, e.g., on one or more server computers forming what is known as a "cloud" infrastructure, that includes radio station frequencies mapped to location information. Further, one or more of the radio station frequencies may be mapped to additional radio station information, such as genre, radio signal origin (e.g., GPS coordinates of the broadcast tower), tower broadcast power, signal strength, and/or other information. In some examples, the database may include other attributes of the radio stations such as capability or permission information, which indicates e.g. one or more of capabilities, permissions and subscriptions required by the receiving device in order to receive an output audio broadcast by the radio station. Once radio station information and user location are received, the database is accessed to determine whether the radio station frequency has been previously stored in a mapping to one or more locations. If the mapping does not exist, a new mapping is generated and stored in the database along with the user location information and radio station characteristics that are identified from the radio station information. If the mapping does exist, the location information can be updated, along with any new or different radio station characteristics identified from the radio station information that is not already stored with the mapping. Thus, the database can include up-to-date broadcast coverage information based on actual radio station information as received by users in real time. Further, because geographic features can affect the availability of signals, the stored location information can be more accurate than other available station data (e.g., made available by the Federal Communication Commission, or "FCC") because any stored location is an actual location where a signal was received by a client device. Moreover, available station data may not be available in various regions such as Europe.

Once a database of radio station information has been generated, a client device can download radio station information that is pertinent to one or more locations of the user and radio station selection criteria. For example, a user may utilize a mapping application executing on the client device to plan a trip trajectory that includes a starting location and a destination. The radio station selection criteria may include capabilities, permissions and/or subscriptions of the client device. For instance, certain client devices may not have permission or the necessary capabilities to receive and/or decode particular radio stations. In addition or alternatively, the radio station selection criteria may include listener preferences associated with a user, such as radio station genres of interest, radio stations commonly listened to by the user, and/or song preferences of the user. One or more locations associated with the user trip, such as waypoint locations along the trip route, may be provided to a remote computer along with one or more of the user preferences. In response to providing the location(s) and the radio station selection criteria, the client device receives a list of radio stations from the remote computer. The list may include, for example, radio station frequencies, radio tower locations, station genre, station call letters, and/or additional or alternative station information for one or more radio stations. In some implementations, the radio station list may be tailored to include information related to only stations that are available at the one or more locations associated with the user trip as well as the provided radio station selection criteria. Thus, only radio station information that is of value to the user during the user trip is downloaded, saving network usage time and storage space. Further, because the station list is stored locally, the client device does not require a network connection to suggest alternative radio stations while the user travels along the route to the destination location.

In some implementations, a method is described to provide a location and radio station selection criteria (e.g. as described above) to a remote computer, receive radio station information from the remote computer, and render graphical information via an application that is executing on the client device. For example, a mapping application may be executing on a smartphone or vehicle computer of a user, and the user may access the application to map a location (e.g., the current location of the device). The radio station information provided by the remote computer is tailored to the provided location (e.g., radio stations in the vicinity of the location) and the radio station selection criteria (e.g., device permissions or user preferences such as genres of interest to the user). Further, the radio station information can include coverage information for the radio stations that may be graphically rendered by the application executing on the client device.

In some implementations, the graphical information may be rendered as a radio station mapping layer of a mapping application. For example, the user may access the mapping application and select a radio station mapping layer that provides shaded and/or at least partially transparent or translucent regions that are representative of the coverage areas of radio stations that are near the location. In some implementations, the shading of the coverage areas may change as the location of the client device changes. For example, a coverage area may be shaded in green if the client device is currently within the coverage area, yellow if the client device is on the border of the coverage area, and red if the client device is not within the coverage area. In some cases, the user may select (e.g., tap) these shaded regions to cause their terrestrial radio system to tune its antenna to the selected frequency.

In some implementations, Internet radio may be incorporated into techniques described herein. For example, in some implementations in which radio stations are identified based on an itinerary planned by a user, geographic "holes" in terrestrial radio coverage may be identified. Suppose the user likes jazz, but there is a geographic portion (or "hole") of his or her trip in which no terrestrial radio stations broadcasting jazz are available. In some implementations, if the user is determined to have (or likely will have) cellular or other network service availability within these geographic holes, the user's client device may automatically transition to an Internet-based jazz radio station, at least until the user is within range of another terrestrial station that broadcasts jazz music. As used herein, an "audio stream" may include, Internet radio stations, terrestrial radio stations, satellite-based radio stations, and/or other broadcast audio stations that a user may select to be provided with audio from a source.

The above is provided as an overview of some implementations disclosed herein. Further description of these and other implementations is provided below.

In some implementations, a method performed by one or more processors is provided that includes receiving, from a client device of a user while the client device travels across a geographic area, radio station information and a first reported user location. The radio station information is obtained by the client device from terrestrial radio metadata received at a terrestrial radio antenna of the client device. The method further includes determining a radio station frequency and one or more additional radio station attributes from the radio station information. The method further includes identifying a database of radio station mappings. Each mapping, of the database of radio station mappings includes a reported radio station frequency and one or more additional radio station attributes mapped to one or more reported user locations. The reported user locations have been determined based on previously reported radio station information from at least one of the client device and other client devices. The method further includes determining that the radio station frequency is not in the database and, in response to determining that the radio station frequency is not in the database: generating a new radio station mapping and storing the new radio station mapping in the database. The new radio station mapping includes the first reported user location as a new reported user location and the radio station frequency as a new reported frequency. The database is accessible to one or more other client devices to facilitate transition between radio stations while the one or more client devices are transported across the geographic area.

These and other implementations of technology disclosed herein may optionally include one or more of the following features.

In some implementations, the method further includes receiving, from a second client device while the second client device is transported across the geographic area, second radio station information and a second reported user location. The second radio station information is obtained by the second client device from second terrestrial radio metadata received at a terrestrial radio antenna of the second client device. In those implementations, the method further includes: determining a second radio station frequency and one or more second radio station attributes from the second radio station information; identifying the new radio station mapping from the database based on the second radio station frequency matching the reported frequency of the new radio station mapping; and updating the new reported user location of the new radio station mapping based on the second reported user location. In some of those implementations, the first reported user location is a coverage area that includes the first reported user location, and wherein updating the reported location includes expanding the coverage area to include the second reported user location.

In some implementations, the one or more additional radio station attributes include at least one of an audio genre, signal originating location, radio station calls letters, and signal strength.

In some implementations, the terrestrial radio metadata received at the terrestrial radio antenna of the client device includes one or more of RDS or RBDS information broadcast with the signal.

In some implementations, the method further includes receiving an indication of a current location or a predicted future location of another client device; and responding to the received indication by identifying, based on the current location or the predicted future location, at least one of the radio mappings stored in the database and providing the identified at least one of the radio mappings to the other client device.

In some implementations, the first reported user location is determined based on triangulation of one or more terrestrial radio signals.

In some implementations, the first reported user location is determined based on a signal from a position coordinate sensor of the client device.

In some implementations, the method further includes: identifying radio station selection criteria associated with the client device or the user of the user; identifying one or more mappings in the database based on the current reported user location matching one or more locations of the identified mappings; generating a subset of radio stations based on the mappings; and providing the subset of radio stations to the client device. The subset of radio stations is further tailored based on the radio station selection criteria.

In some implementations, a method implemented by one or more processors is provided and includes identifying at least one location associated with a planned travel trajectory of a user, and providing data indicative of the at least one location to a remote computer. The method further includes receiving, in response to the providing, a list of radio stations, where the list of radio stations is tailored to the user based on the at least one location, where the list of radio stations includes a mapping for each of the radio stations, and where each of the mappings includes a radio station frequency mapped to a coverage area. The method further includes: storing the mappings in a database on one or more client devices operated by the user; identifying a current audio stream providing output to the user; determining an attribute of the current audio stream as a radio station selection criteria of the user; identifying a current location of the user; identifying, from the mappings, one or more proximate radio stations with mapped coverage areas that are proximate to the current location based on the current location and the determined radio selection criteria; and outputting data indicative of one or more proximate radio stations to the user as a suggestion via one or more client devices of the user.

These and other implementations of the technology optionally include one or more of the following features.

In some implementations, the method further includes determining a signal strength of the current audio stream. In some of those implementations, outputting the data indicative of one or more proximate radio stations is in response to a determination that the signal strength of the current audio stream does not exceed a threshold strength.

In some implementations, the suggestion is output as a selectable option and the method further includes: in response to user selection of the selectable option, tuning a terrestrial radio antenna to the radio station frequency associated with the suggestion.

In some implementations, the method further includes automatically switching to one of the proximate radio stations for which indicative data was output as the suggestion based on the signal strength of the current audio stream meeting a particular criteria or based on a determination that the distance that has been traveled, or the time that has elapsed, since the suggestion was output has exceeded a threshold.

In some implementations, the method further includes identifying one or more additional radio station selection criteria associated with the client device or the user and providing the one or more additional radio station selection criteria to the remote computer. In some of those implementations, the station list is further tailored to the user based on the one or more additional radio station selection criteria.

In some implementations, a method implemented by one or more processors is provided and includes identifying a location associated with a client device of a user. The method further includes identifying one or more radio station selection criteria associated with the client device or the user, where the radio station selection criteria include attributes of radio stations. The method further includes identifying one or more candidate radio stations, where each of the candidate radio stations is associated with at least a radio frequency, a coverage area, and an attribute. The method further includes selecting a subset of the candidate radio stations, where the subset includes candidate radio stations with coverage areas that are proximate to the location and with attributes that match the radio station selection criteria. The method further includes causing an application executing on the client device to render, as part of a graphical user interface of the application, one or more graphical representations of the one or more candidate radio stations. Each of the one or more graphical representations includes an indication of the coverage area of the respective candidate radio station.

These and other implementations of the technology optionally include one or more of the following features.

In some implementations the application is a mapping application and, optionally, the graphical information is presented as a radio station coverage mapping layer of the mapping application.

In some implementations, each of the one or more graphical representations includes the respective coverage area shaded in a first color, and locations shaded by the first color indicate a geographical area in which the respective candidate radio station is available.

In some implementations, the location is the current location of the client device.

In some implementations, the location is between an origin location and a destination location of a user trip.

In some implementations, the location is a searched location provided to the application via user interface input of the user.

In some implementations, each of the one or more graphical representations is selectable to cause the client device to tune a terrestrial radio antenna to the frequency of the respective candidate radio station In some implementations, one or more of the graphical representations is transparent or translucent.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
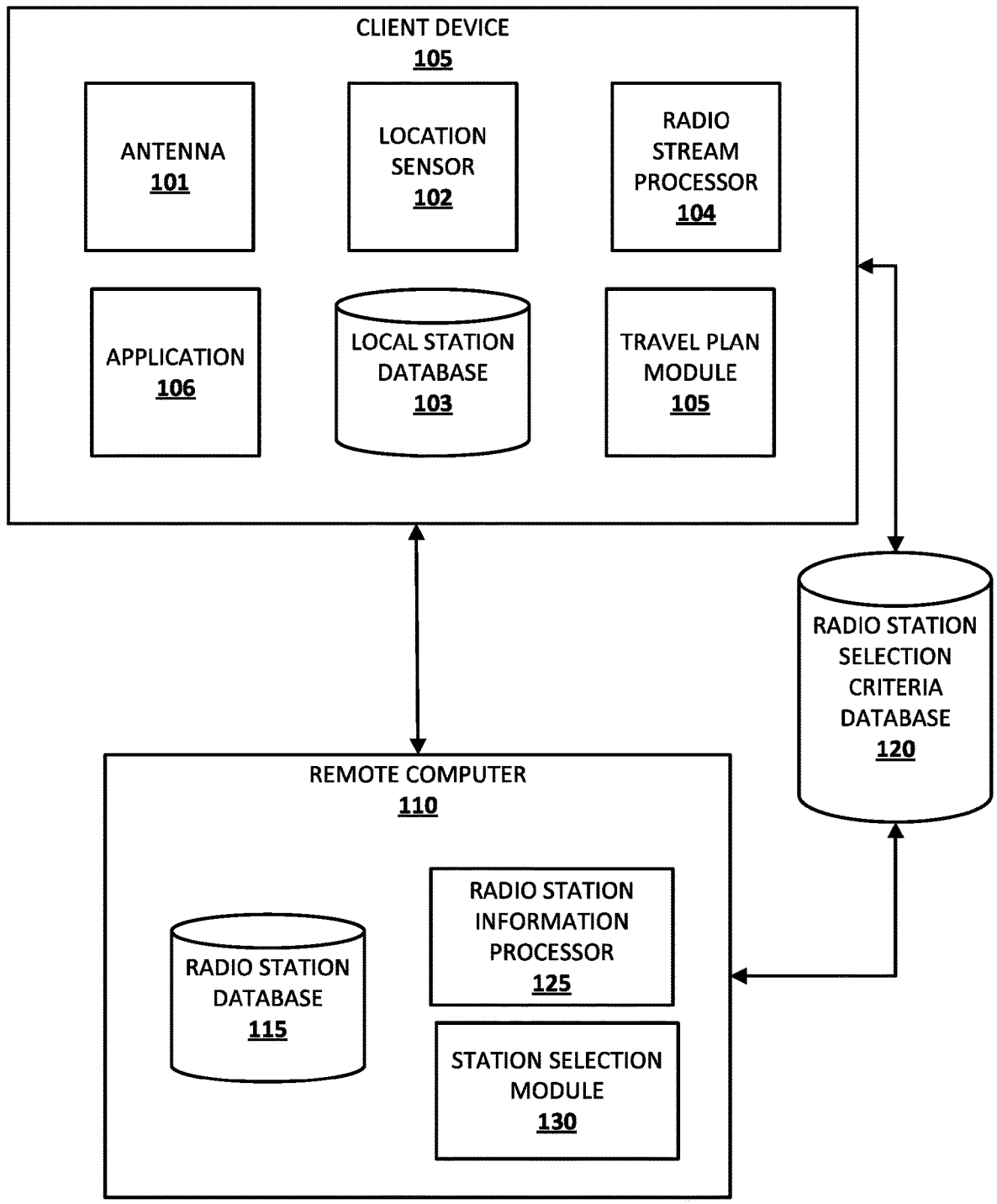
FIG. 1 is a block diagram of an example environment in which implementations disclosed herein can be implemented.

Now turning to FIG. 1, an example environment in which techniques disclosed herein can be implemented is illustrated. The example environment includes a client device 105 and a remote computer 110. Although both the client device 105 and the remote computer 110 are each illustrated in FIG. 1 as single components, it is understood that one or more modules and/or aspects of either can be implemented, in whole or in part, by one or more other devices. For example, in some implementations a first set of modules and/or aspects are implemented by one or more processors of a first remote system, and a second set of modules and/or aspects are implemented by one or more processors of one or more separate remote server device(s) that are in network communication with the remote computer 110. The remote server device(s) can be, for example, a cluster of high performance remote server device(s) (e.g., cloud infrastructure) that handle requests from one or more client devices, as well as requests from additional devices.

Client device 105 may be a mobile phone computing device, a tablet computing device, a computing device of a vehicle of the user (e.g., an in-vehicle communications system, an in-vehicle entertainment system, an in-vehicle navigation system), and/or a wearable apparatus of the user that includes a computing device (e.g., a watch of the user having a computing device, glasses of the user having a computing device, a virtual or augmented reality computing device). Additional and/or alternative client devices may be provided. Further, one or more components of client device 105 may be implemented on separate devices. For example, antenna 101 may be a component of a vehicle that is in communication with the client device 105. Components of client device 105 and components of remote computer 1110 can communicate via a communication network. The communication network may include, for example, a wide area network (WAN) (e.g., the Internet). Further, components of client device 105 may communicate with one or more other components via a communication network. For example, communication network may include a local area network (LAN) and/or BLUETOOTH and may communicate with one or more other devices via the LAN and/or BLUETOOTH (e.g., a vehicle computer communicating with a handheld computing device of a user while the user is traveling in the vehicle). In some implementations, communication between client device 105 and remote computer 110 may be intermittent. For example, client device 105 and remote computer may be in communication on a periodic basis (e.g., once an hour) or based on the occurrence of one or more events (e.g., only when a reliable communication network is available, only when the client device 105 has changed location by a threshold distance).

Client device 105 includes an antenna 101 that receives radio station signals from terrestrial radio stations that are proximate to the antenna 101. As used herein, antenna 101 includes a receiver that can tune to a particular radio frequency, receive a radio signal from an antenna, and process the radio signal to provide audio output based on the radio station signal. The radio stations may be publicly broadcasted radio transmissions and may include, for example, commercial radio stations and/or public radio stations broadcasting radio signals that carry one or more genres of content. For example, a first radio station may broadcast music content (of one or more genres of music) on a first radio frequency and a second radio station may broadcast talk radio content on a second radio frequency.

Antenna 101 further receives metadata via the radio station signal and provides the metadata to radio stream processor 104 for further processing. The metadata may be provided via one or more communication protocols, such as RDS (Radio Data System) and/or RBDS (Radio Broadcast Data System). Radio stream processor 104 can determine radio station information and one or more additional radio station attributes from the radio station information included with the metadata, the content signal, and/or station frequency. For example, the additional attributes may include a genre of the radio station, radio station information (e.g., station nickname, call letters), signal strength, signal originating location, etc.

Client device 105 further includes location sensor 102 that can determine the location of the client device 105. In some implementations, location sensor 102 may determine the location of the client device 105 based on global positioning, triangulation of terrestrial signals (e.g., cellular phone signals, radio station signals), and/or one or more other methods for determining a location of a device within a threshold accuracy.

Client device 105 provides the current location of the user as determined by location sensor 102, the radio station information determined by the radio stream processor 104 from the metadata, and the one or more additional radio station attributes to the remote computer 110. In some implementations, client device 105 may maintain a communication channel open to the remote computer 110 and provide the radio station information, frequency, location, and radio station attributes on a continual basis. In some implementations, client device 105 may provide the radio station information to the remote computer 110, and remote computer 110 may determine one or more of the radio station frequency and/or radio station attribute(s) based on the provided radio station information. In some implementations, client device 105 may only provide radio station information when the location of the client device changes by a threshold distance. For example, the client device may be traveling across a geographic area and client device 105 may provide radio station information and client device location every 10 miles, 25 miles, etc. In some implementations, client device 105 may provide radio station information to remote computer 110 only when the radio station information changes. For example, client device 105 may provide radio station information to remote computer 110 when the antenna 101 identifies a new radio station and/or when the user tunes the radio receiver associated with the antenna 101 to a different radio station.

Figure 2:
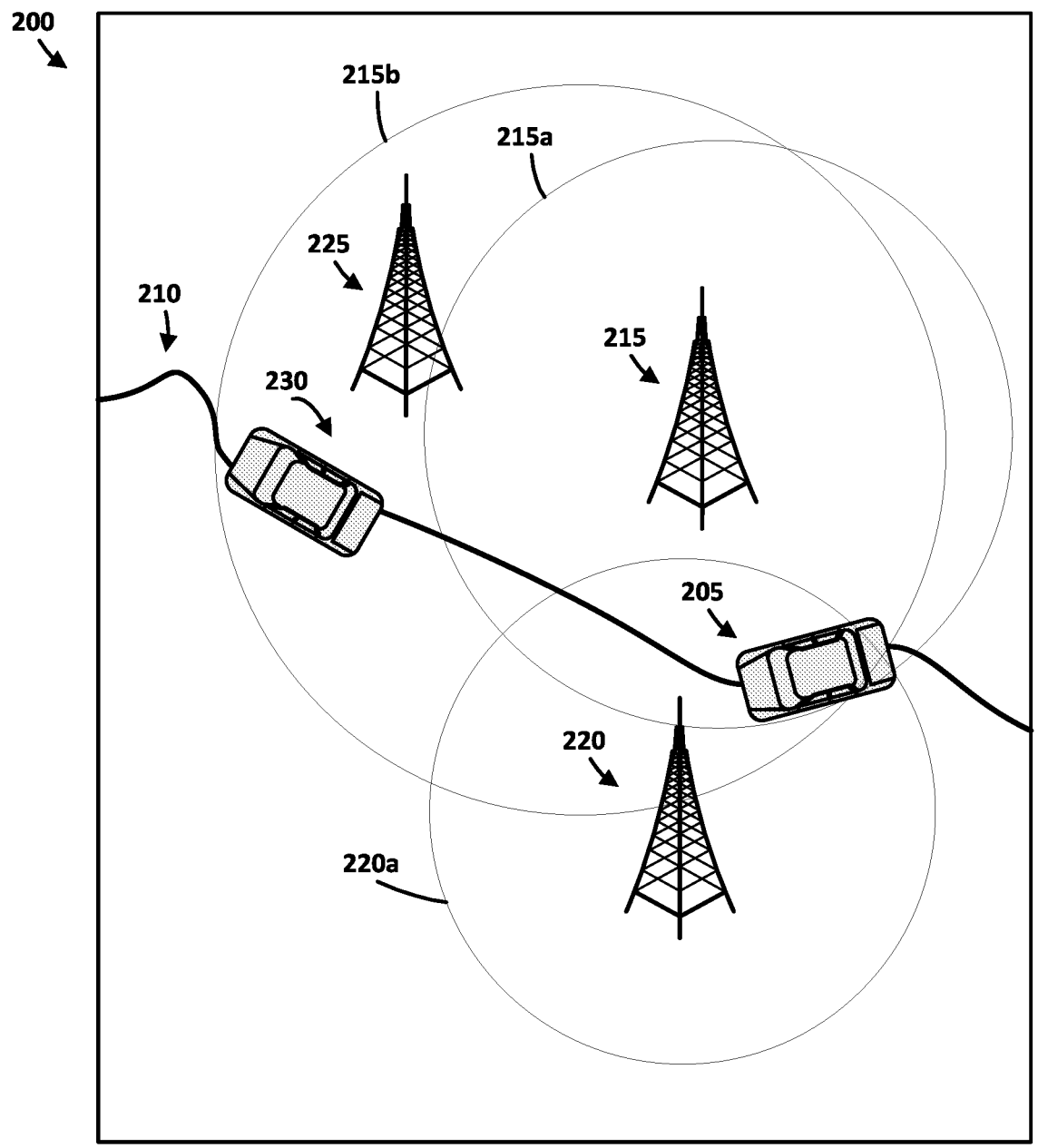
FIG. 2 illustrates client device locations and broadcast locations, and coverage areas of terrestrial radio stations.

As an example, referring to FIG. 2, a map 200 is illustrated that includes a vehicle 205. The vehicle 205 is indicative of a location of a vehicle that is associated with client device 105 (e.g., a vehicle computing device and/or other device associated with a vehicle) that is traveling along a route 210 that crosses a geographic area. As the vehicle 205 enters the transmission range of a first station tower 215, the antenna 101 may receive radio station metadata from the first tower 215. Client device 105 can then determine the location of the vehicle 205 and provide radio station information and the location to the remote computer 110, as described herein. Further, vehicle 205 may be within the transmission range of the second radio station tower 220, which may be associated with a second radio station. Client device 105 may provide the location and radio station information related to the transmission of second tower 220 to remote computer 110. Alternatively or additionally, client device 105 may provide the radio station information from second tower 220 only when the user changes the receiver associated with the antenna 101 to the station associated with the second tower 215. As the vehicle continues along the route 210, the client device 105 may enter the transmission range of third tower 225. Once a new signal is detected and/or when the user tunes to the radio station associated with the third tower 225, client device 105 can provide the radio station information related to the third radio station (i.e., the station associated with the third tower 225) to remote computer 110 along with the new location of the vehicle 205.

Referring again to FIG. 1, remote computer 110 receives the reported user location and radio station information from the client device. In some implementations, client device 105 may further provide one or more radio station attributes. For example, radio stream processor 104 can determine a station name, frequency, signal strength, call letters for the station, and/or genre, and provide the attributes to remote computer 110. In some implementations, only the location and radio station information are provided to remote computer 110 and radio station information processor 125 can determine one or more radio station attributes, including the frequency of the radio station associated with the provided radio station information.

For example, antenna 101 can receive a radio signal that includes metadata encoded with the radio signal. Radio stream processor 104 determines radio station information from the metadata which may include, for example, the radio station frequency, the radio station call letters, genre, and/or station geographic location that is included in the metadata. Further, location sensor 102 determines a current location of the user. The radio station information and the current location (and in some cases, local signal strength or quality) are provided to remote computer 110 and radio station information processor can determine particular radio station attributes from the provided radio station information.

Remote computer 110 includes a radio station database 115 that includes mappings of radio frequencies and one or more radio station attributes mapped to one or more reported user locations. Once radio station information processor 125 determines one or more radio attributes (including a frequency, if not provided by the client device 105), one or more components of remote computer 110 determines whether the frequency is included in the radio station database 115. If a mapping does not exist in the radio station database 115 for the current radio station frequency, a new mapping is generated that includes the radio station frequency mapped to the current location (as provided by the client device 105) and one or more of the attributes, such as localized signal strength/quality. The new mapping is then stored in the radio station database 115.

In some instances, remote computer 110 may not identify a mapping in the radio station database 115 for the provided radio frequency. For example, referring again to FIG. 2, a client device of a first user may provide a location of the vehicle 205 with radio station information from tower 215. Remote computer 110 may not identify a mapping in the radio station database 115 that includes the radio station frequency broadcast by tower 215, and generate a new mapping for the radio station frequency and the location of vehicle 205.

At some subsequent time, a second client device (or subsequently from the same client device) associated with vehicle 230 can provide a second location and the same radio station information as previously received from tower 215. However, when remote computer 110 receives the radio station information, the previous mapping can be identified in the database 115. In response to identifying the mappings, remote computer 110 can update the mapping to include the location of the vehicle 230 (i.e., the new location) and, in some cases, another signal strength/quality measured at the new location.

In some implementations, the stored location of a mapping can be a coverage area and the coverage area may be updated when subsequent locations for a radio station frequency are provided by client devices. A coverage area may include a broadcast area for a particular radio station tower and/or the extent to which a radio station may be received by a terrestrial radio station antenna. In some implementations, a coverage area may be based on publicly available data, such as data provided by one or more governmental agencies. In some implementations, a coverage area may be based on user reported reception of a radio station signal. For example, referring again to FIG. 2, based on the location provided by vehicle 205, a coverage area of 215a may be stored with the radio frequency in the database 115 (i.e., a coverage area that includes the location of vehicle 205). Subsequently, when vehicle 230 provides a location along with the radio station information and frequency from tower 215, the mapping can be updated to include a mapped coverage area 215b that includes both locations 205 and 230. Thus, a coverage area stored with a radio frequency includes known locations where the radio station was received by one or more client devices. Although the coverage areas provided in FIG. 2 are shown as circular, a coverage area may be of any closed shape and not necessarily circular. Thus, because a signal may be partially blocked from reception by geographic features, a coverage area may be shaped to reflect only those areas where the signal is available.

In some implementations, the radio station database 115 may be utilized to provide radio station information to a client device 105 based on one or more locations associated with the client device 105. For example, location sensor 102 may identify a current location of the client device 105 and provide the location to the remote computer 110. Station selection module 130 identifies mappings in the radio station database 115 that are associated with the provided location (e.g., mappings that include the exact location, mappings that include coverage areas that include the provided location, mappings that include locations within a threshold distance to the provided location). Based on the current (i.e., provided) location of the client device 105, station selection module 130 can identify radio station mappings that are associated with radio station frequencies that are likely available to the client device 105 while at the current location. For example, referring again to FIG. 2, a client device 105 of vehicle 205 can provide the current location to the remote computer 110. Station selection module 130 can then identify mappings in the radio station database 115 that include the vehicle 205 location as part of the mapping, such as the stations associated with tower 215 (i.e., the coverage area 215a or 215b) and the station associated with tower 220 (i.e., coverage area 220a). Station selection module 130 can determine a subset of stations that includes the frequencies of the stations associated with tower 215 and tower 220 and provide the subset to client device 105. The subset of radio stations can then be utilized by one or more applications 106 to render content to the user via an interface.

In some implementations, a radio station selection criteria database 120 may include radio station selection criteria for one or more users or client devices. For example, radio station selection criteria database 120 may include listener preferences such as genres of radio stations (e.g., rock, country, talk radio) that one or more users of the client device 105 have interest in being provided. For example, a user may submit a listing of radio stations of interest, genres of interest, and/or favorite songs to one or more services and, based on the provided information, listener preferences may be generated. Additionally or alternatively, the radio station selection criteria database may include listener preference that are generated based on identifying stations that the user has listened to in the past, songs that the user has listened to (or changed radio stations to stop listening to), and/or other indications of listener preferences of the user. As illustrated, the radio station selection criteria database 120 may be accessible to either the client device 105 (e.g., stored locally with the client 105) and/or accessible directly by the remote computer 110 (e.g., a database of listener preferences for multiple users).

In addition to determining a subset of radio stations based on the current location of the client device 105, station selection module 130 may identify mappings in the radio station database 115 that are associated with one or more station attributes that match one or more of the radio station selection criteria. For example, client device 105 may provide the current location of the client device 105 with one or more listener preferences, such as a "country" genre, and station selection module 130 can identify mappings that include both the current location and the genre of "country." Thus, the subset of stations is tailored to both the current location of the user and the radio station selection criteria. Similarly, client device 105 may provide a current location of the user and identifiers of one or more users (e.g., users that are present in a vehicle, the user associated with the client device 105), radio station selection criteria in the radio station selection criteria 120 for each of the users, and provide a subset tailored to the collective radio station selection criteria of the users that are available at the provided location.

In some implementations, a travel plan module 105 may be utilized to determine a travel trajectory of a user. For example, a user may utilize a travel plan module 105 to determine a route (i.e., travel trajectory) for a trip by entering a starting location and a destination. Travel plan module 105 can determine a path to traverse between the starting location and the destination. In some implementations, one or more locations along the travel trajectory may be selected and provided to remote computer 110 to determine radio stations that are available along the travel trajectory. For example, a user may enter "City A" as a starting location and "City B" as a destination, and one or more locations along the travel path, such as locations every 50 miles along the path, can be provided to remote computer 110 as representative of the travel trajectory. Station selection module 130 can determine a subset of radio stations based on the locations. Further, in some implementations, the subset may be tailored based on radio station selection criteria, as described herein.

Once station selection module 130 determines a subset of radio stations from the radio station database 115, the subset is provided to the client device 105 and stored in the local station database 103. The local station database 103 can include any radio stations that have been previously provided by remote computer 110 so that, for any location of the client device 105, any previously provided radio stations that are within range (i.e., stations mapped to the location) may be identified in the database. Thus, the locations from the subset of radio stations provided by remote computer 110 are stored mapped to the radio stations that are available at each of the locations.

Once the mappings have been stored in local station database 115, the locations may be utilized to provide radio station suggestions to the user while traveling along the trajectory. Based on a current radio station being received by antenna 101, radio stream processor 104 can determine an attribute (e.g. genre) based on the metadata included with the broadcast signal, as described herein. Further, location sensor 102 can determine a current location of the user, as described herein. Based on the attribute of the current station and the location, client device 105 can identify one or more of the mappings in the local station database 103 that are proximate to the current location and that have the same or similar attribute to the current radio station.

Figure 3:
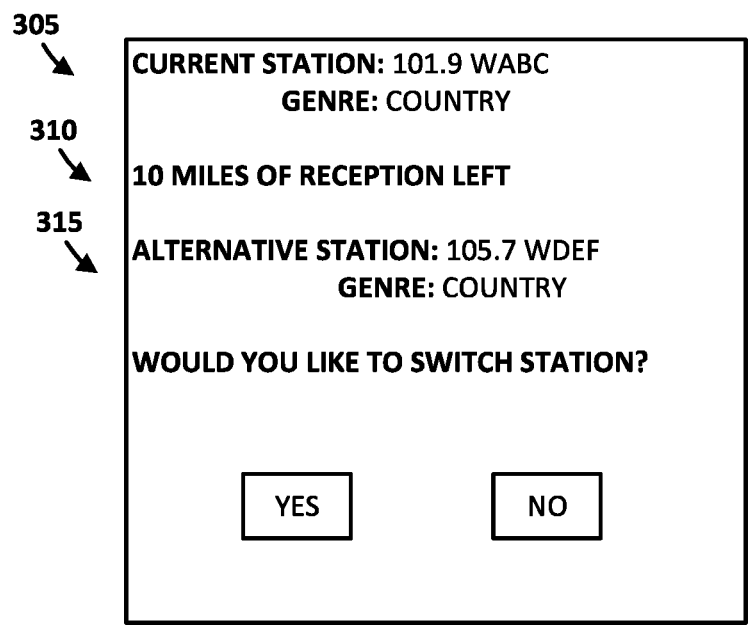
FIG. 3 illustrates a graphical interface for an application to suggest radio stations to a user according to implementations described herein.

Application 106 can output information related to one or more of the selected radio station mappings to provide the user with a suggestion of an alternative radio station that may be available. For example, referring to FIG. 3, an example interface is illustrated that provides a suggestion of an alternative radio station to a user. The interface includes a current station indication 305 that provides the user with the name of the currently tuned radio station and the attribute, in this example the genre, of the current radio station. Further, the interface includes a suggested radio station 315 that can be identified from the mappings stored in local station database 103 based on the genre "country" matching the "country" genre of the suggested radio station. Further, the suggested station is identified based on a current location of the client device so that the suggested radio station is currently available (or will be available once the client device 105 is within a threshold distance of the client device 105).

In some implementations, providing a suggestion to a user via an application interface may be based on the signal strength of the current radio station signal. For example, a receiver of antenna 101 and/or one or more other components of client device 105 may determine that the radio station that is currently being received is at a threshold weakness (e.g., starting to be lost be the antenna 101, degrading to a level that is likely unacceptable to the user). The suggestion of an alternative radio station may occur when the signal is determined to be below a threshold strength. For example, referring again to FIG. 3, a strength warning indication 310 provides the user with a warning that the current radio station will likely be out of range if the client device 105 moves by 10 miles. Thus, the interface of FIG. 3 may be provided to the user while the current radio station is still available but will be lost within a distance to allow for the user to change stations before completely losing the current radio station. In some implementations, the user may opt (e.g. while configuring the application 106) to allow the client device 105 to change the radio station to the suggested station automatically (i.e. without receiving user input). In some examples, the automatic changing to the suggested station may be performed in response to determining that one or more criterion has been met. For instance, the criteria may be that: a threshold distance has been traversed since the suggestion was provided, a particular duration has elapsed since the suggestion was provided, less than a threshold distance remains of the area of coverage of the current station, and/or the current radio station strength is below a threshold strength. In this way, when a current radio station is no longer available (or is soon to be unavailable), the client device may tune itself to an alternative radio station that is compatible with the device and/or is likely to be acceptable to the driver without the driver being required to interact with the client device while driving. Thus, distraction of the driver may be reduced.

In some implementations, one or more candidate radio stations may be provided to a user via graphical representations of the coverage areas of nearby and/or available radio stations. One or more candidate radio stations may be selected from local station database 103 and/or radio station database 115 based on the current location of the user and radio station selection criteria, as described herein. The coverage areas of each of the candidate radio stations may then be provided to the user via a graphical interface of application 106, with the coverage areas represented on the graphical interface. The application may be, for example, a mapping application. The candidate radio station coverage areas may be rendered via a layer of the mapping application such that the user is provided with a visual representation of the current location of the client device 105 and of the coverage areas in relation to the current location.

Figure 4:
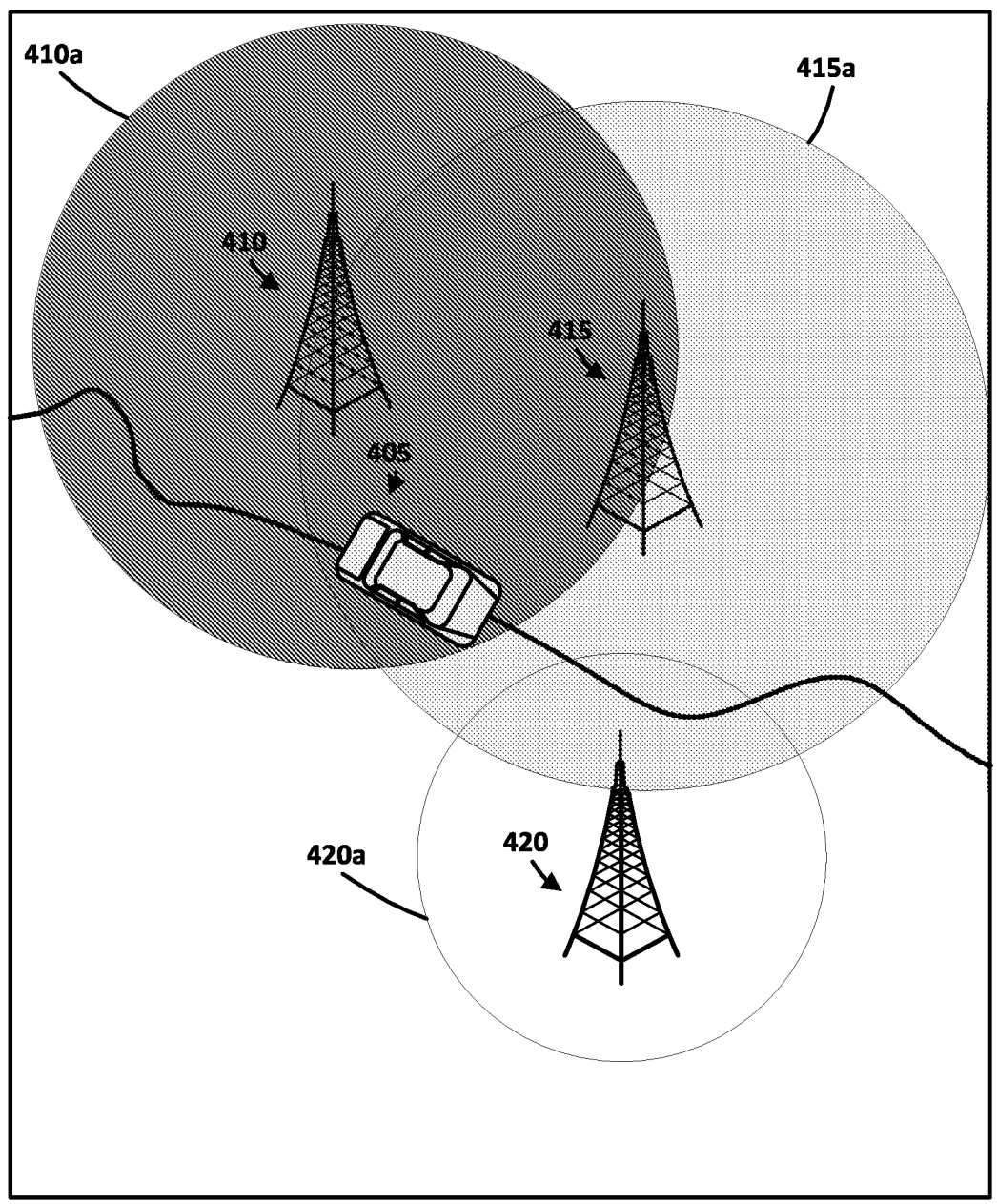
FIG. 4 illustrates a graphical interface of a mapping application with a radio station mapping layer providing visual representations of proximate radio stations.

For example, referring to FIG. 4, a mapping application interface is illustrated that includes graphical representations of coverage areas of three radio station broadcast towers. As previously noted, although the coverage areas are illustrated as circular, a mapping application may represent coverage areas by any varied closed shape to indicate the areas where the signal has been determined to be available. The vehicle 405 is illustrated as being located within a geographic area that includes a first tower 410, a second tower 415, and a third tower 420. The mapping application interface further includes representations of the signal coverage areas 410a, 415a, and 420a that have been identified for the signal from each of the towers. Thus, based on the interface map illustrated in FIG. 4, a user can identify that the client device 105 can currently receive a signal from tower 410 based on the vehicle indicator 405 being within the coverage area 410a. Further, a user can identify that the client device 105 can currently receive a signal from tower 415 based on vehicle 405 being currently located within coverage area 415a. Further, a user being provided the map of FIG. 4 can determine that the signal from tower 420 is not currently available but that the signal will likely become available if the vehicle 405 moves to within coverage area 420a.

In some implementations, one or more rendered coverage areas may be rendered in different colors and/or shades to indicate signal strength and/or other station attributes. For example, referring again to FIG. 4, coverage area 410a is rendered darker than coverage areas 415a and 420a, which can indicate that the signal from tower 410 is stronger than the signals from the other towers. Also, for example, coverage area 420a is shaded lighter (or not shaded at all), which can indicate that the signal from tower 420 is not currently available.

In some implementations, the graphical representations may be interactive and selecting one of the coverage areas (or towers or other provided information) causes the receiver associated with antenna 101 to tune to the corresponding radio station. For example, referring again to FIG. 4, the graphical representation may be selectable (a touchscreen, an interface with a mouse and/or other peripheral) and the user may select within the coverage area 415*a* to cause the client device 105 to tune to the radio station associated with 415*a*. Additionally or alternatively, a user may select a coverage area and be provided with additional information related to the radio station associated with the coverage area, including an option to select the radio station.

Although only towers and coverage areas are illustrated in FIG. 4, additional and/or alternative graphical representations may be provided via an interface. For example, one or more of the coverage areas may be labelled with radio station information, the towers may not be illustrated in the graphical representation, and/or other features may be provided with the graphical representation. Further, although the examples herein indicate that the location of the vehicle 405 in the graphical representation is indicative of a current location of the client device 105, a graphical representation sharing one or more characteristics with FIG. 4 may be provided to a user when a user searches for a particular location (i.e., a searched-for location instead of a current location) and/or when a user provides a travel plan and is provided with a mapping of the route (i.e., graphical representation of coverage areas along a route instead of a current location).

Figure 5:
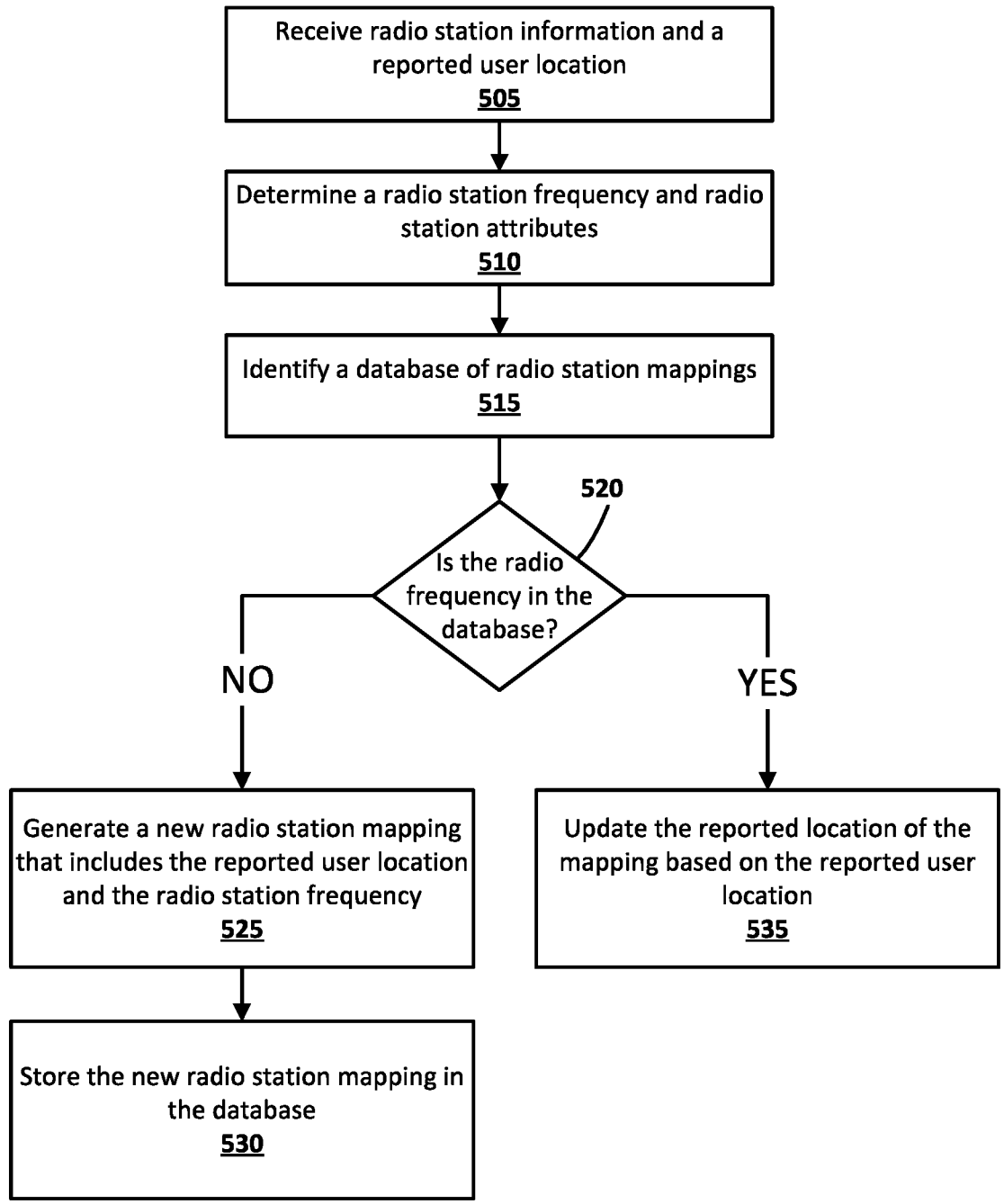
FIG. 5 illustrates a flowchart of an example method for generating a database of mappings of radio station signals and radio station locations.

FIG. 5 illustrates a flowchart of an example method for generating a database of radio station mappings from reported user locations. The steps of FIG. 5 can be performed by one or more processors, such as one or more processors of a client device. Other implementations may include additional steps than those illustrated in FIG. 5, may perform step(s) of FIG. 5 in a different order and/or in parallel, and/or may omit one or more of the steps of FIG. 5.

At step 505, radio station information and a reported user location are received. The radio station information and a reported user location can be provided by a component that shares one or more characteristics with client device 105. For example, an antenna 101 can receive a radio signal that includes metadata related to the radio station, such as an RDS and/or NRDS compliant information that encodes one or more attributes of the radio signal (e.g., origin, location, radio station name, call letters, genre, current song). The radio station information can be determined from the metadata by a component that shares one or more characteristics with radio stream processor 104. The radio station information can be provided to a component that shares one or more characteristics with remote computer 110. Further, a component that shares one or more characteristics with location sensor 102 may determine a current location of the client device 105 and provide the reported location to remote computer 110. The location may be determined based on, for example, signal triangulation, global positioning satellites, and/or one or more other methods to determine a geographic location of the client device 105.

At step 510, a radio station frequency and one or more radio station attributes are determined based on the radio station information. The radio station frequency and one or more attributes can be determined by a component that shares one or more characteristics with radio station information processor 125. For example, based on the provided radio station information, radio station information processor 125 may determine the radio station frequency and one or more radio station attributes, such as a genre for the radio station, the station call letters, and/or one or more radio tower locations.

At step 515, a database of radio station mappings is identified. The database can share one or more characteristics with radio station database 115. For example, the database can include one or more radio station frequencies mapped to one or more reported locations where one or more client devices have received a signal at the radio station frequency. Further, the mappings in the database may include one or more radio station attributes that were determined by radio station information processor 125. In some implementations, the reported location(s) stored with one or more mappings in the database can be a coverage area that includes a representation of a geographic area where one or more client devices detected and/or received the radio station frequency.

At decision 520, one or more components determines whether the radio station frequency is included with one or more mappings in the database. For example, one or more components of remote computer 110 may access the database 115 and determine whether the reported location is included in one or more mappings in the database 115. If no such mapping is identified, at step 525, a new radio station mapping is generated that includes the reported user location and the radio station frequency. Further, the new radio station mapping can include one or more radio station attributes, as determined by the radio station information processor 125. At step 530, the new radio station mapping is stored in the database.

Figure 6:
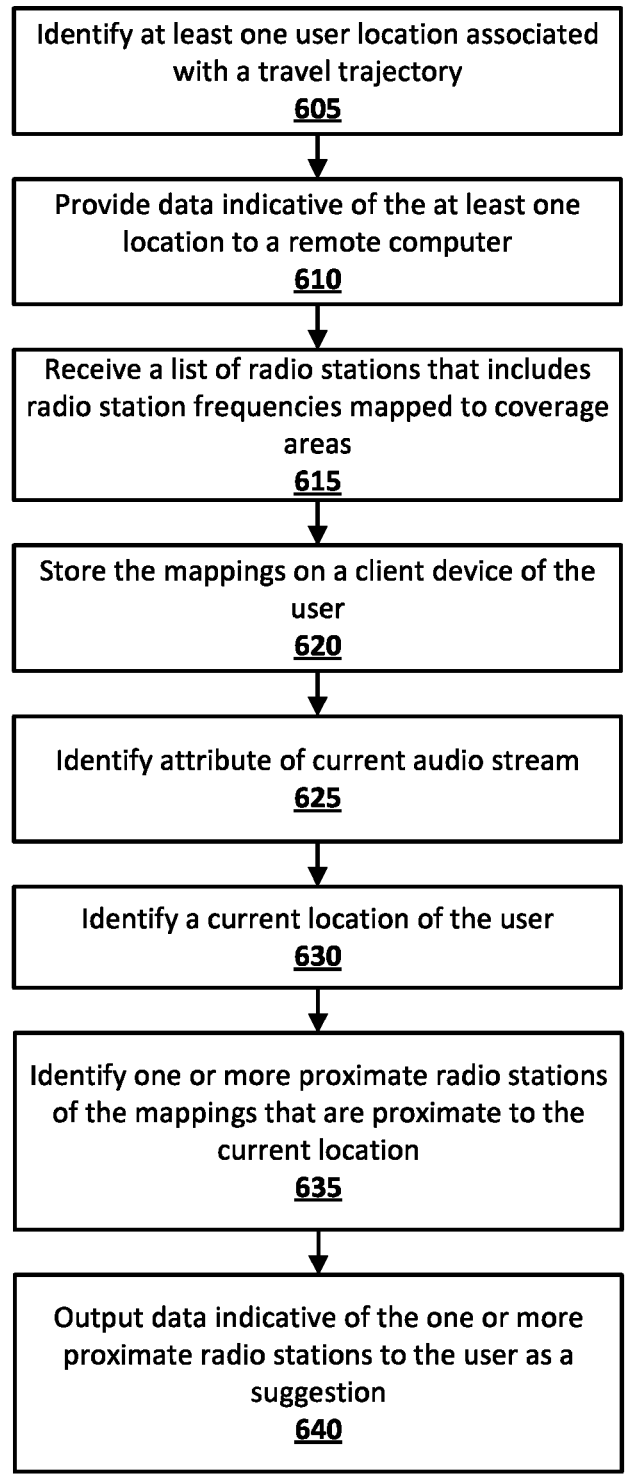
FIG. 6 illustrates a flowchart of an example method for utilizing a database of radio stations signals and locations to provide a client device with a radio station suggestion.

If a mapping is identified in the database that includes the radio station frequency, at step 535, the identified radio station mapping is updated based on the reported user location. For example, a mapping may be identified that includes a single client device location that was previously submitted according to the previously described method steps. Subsequently, a second client device (or the same client device in a second location) can provide the same radio station frequency with a second location. The radio station mapping in the database can be updated to include both the first reported user location and the second reported user location. Additionally or alternatively, if a coverage area is stored with the identified mapping, the coverage area may be updated to include the first reported user location and the second reported user location. Coverages areas stored with radio station frequencies may be updated each time a new reported user location is submitted, thus updating the coverage area to include all areas where a client device reported receiving the associated radio frequency, FIG. 6 illustrates a flowchart of an example method for selectively downloading radio station information that is tailored to a user and a travel trajectory of the user. The steps of FIG. 6 can be performed by one or more processors, such as one or more processors of a client device. Other implementations may include additional steps than those illustrated in FIG. 6, may perform step(s) of FIG. 6 in a different order and/or in parallel, and/or may omit one or more of the steps of FIG. 6.

At step 605, at least one user location that is associated with a travel trajectory of the user is identified. The user location may be a current location of a user and can be identified by a component that shares one or more characteristics with location sensor 102. Alternatively, a user may provide a travel plan to a travel plan module, such as travel plan module 105, which can determine a travel trajectory for the travel plan (i.e., a path from a starting location to a destination). One or more locations, such as waypoints, along the travel trajectory may be selected as user locations. At step 610, data indicative of the user location(s) are provided to a remote computer. The remote computer can share one or more characteristics with remote computer 110.

At step 615, in response to providing the one or more user locations, a list of radio stations is provided. The list of radio stations can be provided by a component that shares one or more characteristics with remote computer 110. For example, station selection module may determine, based on the mappings in radio station database 115 and the provided locations, one or more radio stations of interest to the user. In some implementations, the provided list of radio stations includes all radio stations that are available on the travel trajectory (e.g., radio stations that include locations and/or coverage areas that include the provided location(s)). In some implementations, one or more radio station selection criteria can be provided with the location(s) and station selection module 130 can provide a list of radio stations that includes only radio stations that satisfy the radio station selection criteria and are within range of the provided locations.

At step 620, the mappings are stored in a local database. The local database can share one or more characteristics with location station database 103. For example, the local database can be stored locally on a client device and/or on a peripheral device. By storing the list of radio stations locally, a network connection to the remote computer 110 is not required after the list is downloaded. Thus, storage requirements are reduced by only storing locally on the client device the radio station information that is pertinent to the user and/or the travel trajectory of the user. Further, because a network connection to remote computer 110 is not required, the radio station information is more reliably available than data that is accessed via a network connection (e.g., when a network signal is not available).

At step 625, an attribute (e.g. the genre) of a current audio stream of the user is identified. The current audio stream may include, for example, a radio station that the user is tuned to via the antenna 101 of client device 105, a satellite radio station that the user is currently receiving via one or more components of client device, 105, and/or an internet-based radio station that the user is currently streaming via one or more devices. In some implementations, the attribute of the audio stream can be identified by a component that shares one or more characteristics with radio stream processor 104. For example, the attribute may be identified based on metadata associated with the radio signal. In examples in which the attribute is the genre, one or more components may identify the genre based on content being broadcast on the audio stream, such as a song recognition module that can identify and classify a broadcast song to determine the genre.

At step 630, a current location of the user is identified. The current location can be identified by a component that shares one or more characteristics with location sensor 102. For example, a current user location can be identified based on signal triangulation, GPS, and/or one or more alternative methods for determining a geographic location of the client device 105.

At step 635, one or more proximate radio stations is identified based on the mappings in the local database. The proximate radio stations can be identified based on the proximity of the current location of the user to one or more locations stored with the radio stations in the local database. For example, proximate radio streams may include radio stations stored with locations within a threshold distance of the current location of the user and/or radio stations stored with coverage areas that include the current location. Further, the proximate radio stations are identified based on the current attribute (e.g. genre) of the user. For example, the selected proximate radio stations can include only streams that are of the same genre and/or a related genre to the current audio stream, based on genre information stored with the radio stations.

At step 640, data indicative of one or more of the proximate radio stations is outputted to the user as a suggestion. In some implementations, the suggestion may be provided via a visual and/or audio output device that can indicate to the user that one or more alternate radio stations is available. For example, a graphical interface may be provided to the user that indicates an alternative to the currently received radio station, but with the same or similar attribute, is available. Additionally or alternatively, an alternative radio station suggestion can be provided to the user when a current signal strength falls below a threshold strength.

Figure 7:
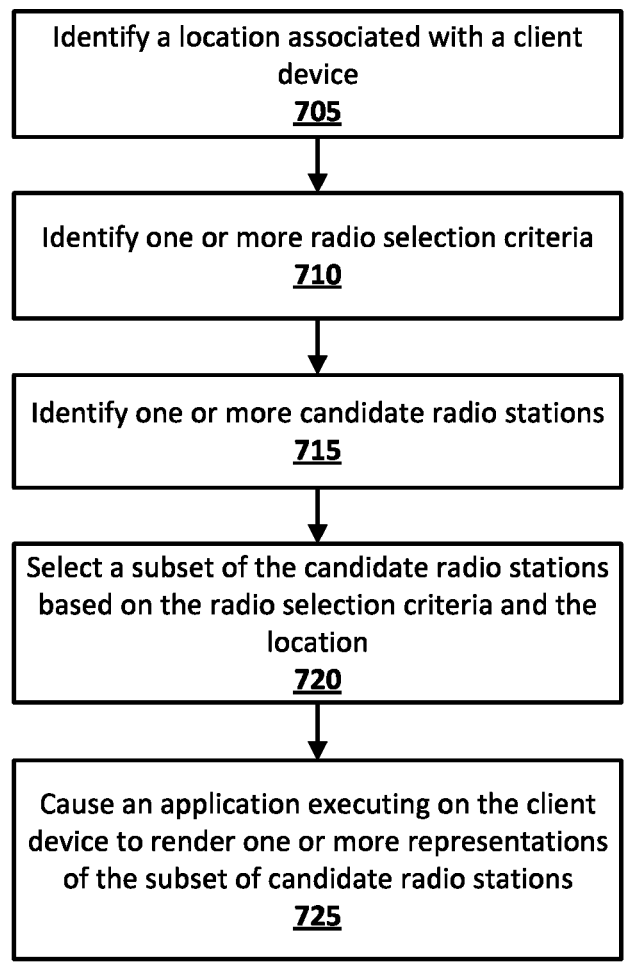
FIG. 7 illustrates a flowchart of an example method for utilizing a database of radio stations signals and locations to provide a client device with radio station information to be rendered graphically by an application executing on the client device.

FIG. 7 illustrates a flowchart of an example method for causing an application executing on a client device to render graphical representations of one or more radio station coverage areas. The steps of FIG. 7 can be performed by one or more processors, such as one or more processors of a client device. Other implementations may include additional steps than those illustrated in FIG. 7, may perform step(s) of FIG. 7 in a different order and/or in parallel, and/or may omit one or more of the steps of FIG. 7.

At step 705, a location associated with a client device is identified. The client device can share one or more characteristics with client device 105. Thus, the location associated with the client device 105 can be determined by a component that shares one or more characteristics with location sensor 102. In some implementations, a location associated with the client device may be determined by one or more alternative methods. For example, a user may search for a location that is not the current location of the client device utilizing one or more applications executing on the client device (e.g., a search engine, a mapping application).

At step 710, one or more radio station selection criteria (which may include listening preferences of the user and/or device capabilities/permissions) are identified. The radio station selection criteria can be identified in a database that shares one or more characteristics with radio station selection criteria database 120. As mentioned above, listener preferences can include, for example, genres of interest to the user, favorite songs of the user, previously played songs of the user, previously tunes radio stations of the user, and/or other indications of the listening habits and/or preferences of the user.

At step 715, one or more candidate radio stations are identified. In some implementations, the candidate radio stations can be identified by a component that shares one or more characteristics with remote computer 110. For example, a client device 105 can provide a location, radio station selection criteria, and/or other request to remote computer 110 and station selection module 130 can select candidate radio stations to provide to the client device 105. In some implementations, the candidate radio stations can be identified in a database that is local to the client device, such as local station database 103.

At step 720, a subset of the candidate radio stations is selected based on the radio station selection criteria and the location of the client device. The candidate radio stations can be identified based on the location associated with the client device. For example, a local database that shares one or more characteristics with local station database 103 can include mappings of radio stations and locations, as described herein. The candidate radio stations can include radio stations that are mapped to the location associated with the client device, to locations that are in proximity to the location associated with the client device, and/or to coverage areas that include the location associated with the client device.

At step 725, one or more components causes an application executing on the client device to render one or more graphical representations of the subset of candidate radio stations. The application can share one or more characteristics with application 106 of client device 105. For example, the application can be a mapping application and the subset of candidate radio stations can be rendered based on coverage areas associated with the radio stations. In some implementations, the radio stations can be rendered such that the graphical representations are interactive. For example, one or more graphical representations of the candidate radio stations may be selectable, and a receiver associated with the client device 105 can tune to a radio station in response to a user selecting the graphical representation.

Figure 8:
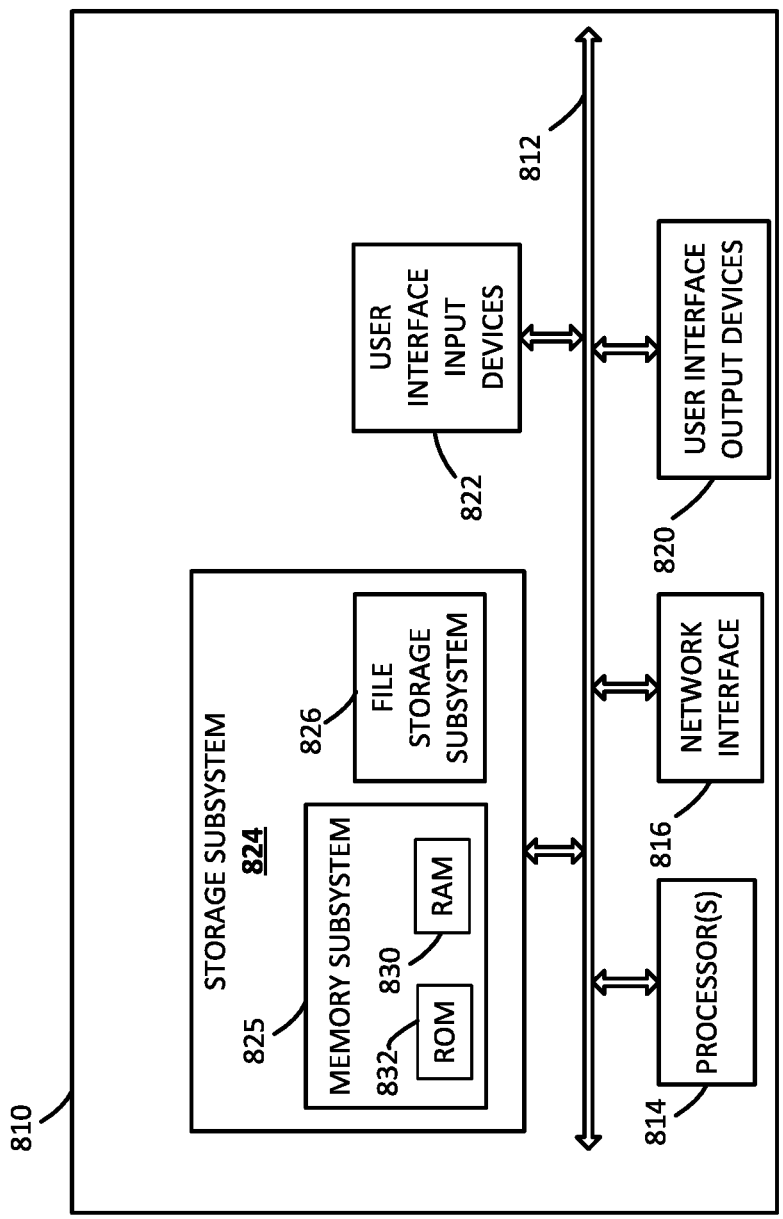
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method described herein, as well as to implement various components depicted in FIG. 1.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method of crowd-sourcing radio station mappings, the method implemented by one or more processors and comprising:
    receiving, from a remote client device of a user while the remote client device travels across a geographic area, radio station information and a first reported user location, wherein the radio station information is obtained by the remote client device from terrestrial radio metadata received at a terrestrial radio antenna of the remote client device;
    determining a radio station frequency and one or more additional radio station attributes from the radio station information;
    identifying a centralized database that stores a plurality of radio station mappings that have been previously crowd-sourced from a plurality of remote client devices, wherein each radio station mapping comprises a reported radio station frequency and one or more additional radio station attributes mapped to one or more reported user locations;
    determining that the radio station frequency is not in the centralized database, wherein the centralized database is accessible to a plurality of remote client devices to facilitate transition between radio stations while any of the plurality of remote client devices is transported across the geographic area to transmit the radio station information;
    in response to determining that the radio station frequency is not in the centralized database, generating a new radio station mapping, wherein the new radio station mapping includes the first reported user location as a new reported user location and the radio station frequency as a new reported frequency; and
    storing the new radio station mapping in the centralized database.

2. The method of claim 1, further comprising:
    receiving, from a second remote client device while the second remote client device is transported across the geographic area, second radio station information and a second reported user location, wherein the second radio station information is obtained by the second remote client device from second terrestrial radio metadata received at a terrestrial radio antenna of the second remote client device;
    determining a second radio station frequency and one or more second radio station attributes from the second radio station information;
    identifying the new radio station mapping from the centralized database based on the second radio station frequency matching the reported frequency of the new radio station mapping; and
    updating the new reported user location of the new radio station mapping based on the second reported user location.

3. The method of claim 2, wherein the first reported user location is a coverage area that includes the first reported user location, and wherein updating the reported location includes expanding the coverage area to include the second reported user location.

4. The method of claim 1, further comprising:
    receiving an indication of a current location or a predicted future location of another remote client device;
    responding to the received indication by identifying, based on the current location or the predicted future location, at least one of the radio mappings stored in the centralized database and providing the identified at least one of the radio mappings to the other remote client device.

5. The method of claim 1, wherein the one or more additional radio station attributes includes at least one of an audio genre, signal originating location, radio station calls letters, and signal strength.

6. The method of claim 1, wherein the terrestrial radio metadata received at the terrestrial radio antenna of the remote client device includes one or more of RDS or RBDS information broadcast with the signal.

7. The method of claim 1, wherein the first reported user location is determined based on triangulation of one or more terrestrial radio signals.

8. The method of claim 1, wherein the first reported user location is determined based on a signal from a position coordinate sensor of the remote client device.

9. The method of claim 1, further comprising:
    identifying radio station selection criteria associated with the remote client device or the user;
    identifying one or more mappings in the centralized database based on the current reported user location matching one or more locations of the identified mappings;
    generating a subset of radio stations based on the mappings, wherein the subset of radio stations is further tailored based on radio station selection criteria; and
    providing the subset of radio stations to the remote client device.

* * * * *